US005232764A

United States Patent [19]

Oshima

[11] Patent Number: 5,232,764

[45] Date of Patent: Aug. 3, 1993

[54] SYNTHETIC RESIN PATTERN SHEET

[75] Inventor: Masahiro Oshima, Higashi-Osaka, Japan

[73] Assignee: Meiwa Gravure Co., Ltd., Osaka, Japan

[21] Appl. No.: 798,069

[22] Filed: Nov. 27, 1991

Related U.S. Application Data

[63] Continuation of Ser. No. 532,569, Jun. 4, 1990, abandoned.

[51] Int. Cl.[5] .......................... B32B 3/10; B32B 3/16; B32B 3/22

[52] U.S. Cl. ...................................... 428/173; 428/67; 428/207; 428/161; 428/187; 428/203; 428/204; 428/24; 428/119; 428/195; 428/156; 428/166; 428/172; 428/178; 428/213; 428/542.2

[58] Field of Search ................. 428/67, 207, 173, 161, 428/187, 203, 204, 24, 119, 195, 156, 166, 172, 178, 213, 542.2

[56] References Cited

U.S. PATENT DOCUMENTS 1,606,169 11/1926 Mayer ................................ 428/173
1,844,083 2/1932 Weber ................................ 428/161
2,134,737 11/1938 Riedel .............................. 428/67 X
2,451,913 10/1948 Brice ................................... 428/67
3,399,101 8/1968 Magid ................................ 428/159
3,480,500 11/1969 Hotter ............................ 428/161 X
3,695,982 10/1972 Brody ............................... 428/67 X
3,905,849 9/1975 Bomboire ........................ 428/159 X
3,958,054 5/1976 McKee, Jr. et al. ........... 428/161 X
4,816,318 3/1989 Dorsey et al. .................. 428/173 X
4,881,999 11/1989 Balmer et al. .................. 428/173 X

FOREIGN PATENT DOCUMENTS 0111253 8/1980 Japan .................................. 428/173
0314168 12/1989 Japan .................................. 428/173

*Primary Examiner*—Ellis P. Robinson
*Assistant Examiner*—William P. Watkins, III
*Attorney, Agent, or Firm*—Stevens, Davis, Miller & Mosher

[57] ABSTRACT

A synthetic resin pattern sheet having projecting patterns and provided at the patterns with concave surfaces variable in depth, and in the concave surfaces with different color layers comprising synthetic resin different in coloring from that forming the patterns and being variable in thickness.

3 Claims, 3 Drawing Sheets

SYNTHETIC RESIN PATTERN SHEET

This application is a continuation of application Ser. No. 532,569, filed Jun. 4, 1990 now abandoned.

FIELD OF THE INVENTION

The present invention relates to a synthetic resin pattern sheet used for a bag, a wall decorative material, or a shower curtain, and more particularly to a synthetic resin pattern sheet having patterns varied in color tone or lightness.

BACKGROUND OF THE INVENTION

Conventionally, the synthetic resin pattern sheet used for the shower curtain or the like, as well-known, forms at a synthetic resin sheet uneven colored patterns.

The synthetic resin pattern sheet is colored by the well-known valley dying printing method in such a manner that an embossing roll having the uneveness at the surface corresponding to the patterns is used, printing ink is applied to the projections at the embossing roll surface, a synthetic resin sheet is applied in a press-contacting manner to the embossing roll so as to form the patterns on the synthetic resin sheet, and sumultaneously the patterns are colored with the printing ink.

As another coloring method, a silk-screen printing method has been well-known which, after the embossing roll is used to form patterns on the synthetic resin sheet, carries out silk-screen printing in synchronism with the patterns, thereby coloring the patterns.

The synthetic resin pattern sheet obtained by the above coloring methods is colored only at the patterns on the synthetic resin sheet with the printing ink and distinct at the border between the colored pattern and the not-colored portion, thereby enabling the colored patterns to be displayed with emphasis to the exterior.

The synthetic resin pattern sheet, as the above-mentioned, distinguishes the colored patterns from the not-colored portions so as to demonstrate the stereo effect by polychrome printing, but the patterns are merely all over colored with the printing ink. Therefore, in a case where, for example, patterns of leaves and flowers of plants are formed, the natural color tone or lightness of plants is not variable in a continuing manner, so that variation in depth of each pattern cannot appear, thereby creating the problem in that the patterns on the synthetic resin sheet are less in the natural feeling and stereo effect.

SUMMARY OF THE INVENTION

In the light of the above problem, the present invention has been designed. An object thereof is to provide a synthetic resin pattern sheet which is continuously variable of color tone and lightness of the patterns and displays the variation in the color tone and lightness to the exterior, thereby being rich in the natural feeling and stereo effect.

The synthetic resin pattern sheet of the invention is characterized by providing; a sheet body which is formed of synthetic resin, has projecting patterns, and is provided thereat with the concave surfaces variable in depth; and a different color layer contained in the concaved surface of each pattern at the sheet body, comprising synthetic resin different therefrom in coloring, and variable in thickness.

The concave surface of each pattern, when the pattern is molded, is scraped off mainly by a doctor blade, so that in the concave surface is filled translucent or opaque synthetic resin different from the sheet body in coloring thereby forming the different color layer. The different color layer is variable in thickness corresponding to configuration of the concave surface, thereby displaying the color tone and lightness of the patterns variable in a continuous manner.

In other words, part of the different color layer larger in thickness and formed at a deep portion of the concave surface, shows coloring of the different color layer. Accordingly, this part of the different color layer displays a dark color tone. Part of the same smaller in thickness formed at a shallow portion of the concave surface, displays a light color tone of patterns through this part. Thus, the color tone is continuously varied from each different color layer to the pattern, thereby displaying each pattern varying in the color tone and lightness in a naturally graduating manner and being rich in the natural feeling and stereo effect.

The present invention is preferred to stick a transparent or translucent synthetic resin sheet in close-contact with the patterned surface of the sheet body.

Also, a backing sheet, such as woven cloth, non-woven fabric or thermoplastic sheet, may be provided at the rear surface of sheet body. The backing sheet is made different in coloring from the pattern part and different color layer, thereby producing a further effective pattern sheet.

Furthermore, in a case where the synthetic resin sheet and backing sheet are used, it is preferable that between the sheets and in surroundings of the pattern is formed a colored layer of synthetic resin different in color from synthetic resin forming the pattern and different color layer.

Other objects and aspects of the invention will become apparent from the following description of embodiments with reference to the accompanying drawings.

DETAILED DESCRIPTION OF THE INVENTION

Figure 1:
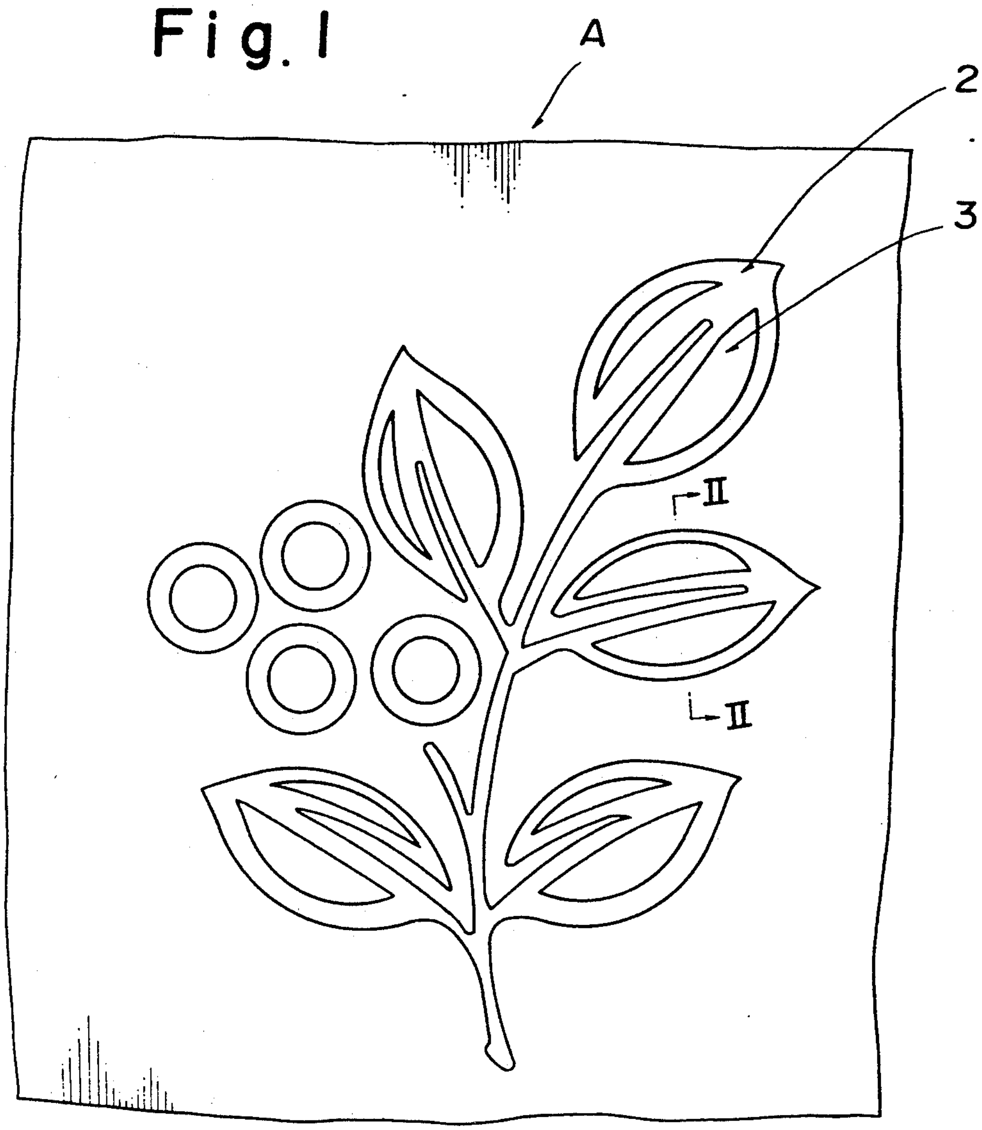
FIG. 1 is a plan view in part of a synthetic resin pattern sheet of the invention.
Figure 2:
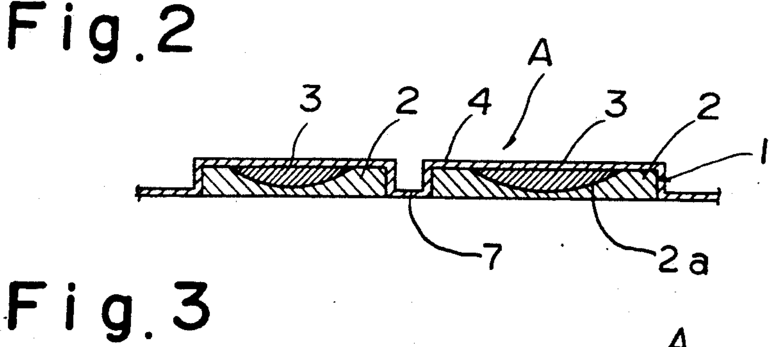
FIG. 2 is an enlarged sectional view taken on the line II—II in FIG. 1.

Referring to FIG. 1, an embodiment of a synthetic resin pattern sheet A of the invention is shown, which has flower-patterns and combines a sheet body 1 formed of synthetic resin and not-continuously provided with a plurality of patterns and a transparent or a translucent synthetic resin sheet 4 creating troughs 7 surrounding the non-continuous patterns as shown in FIG. 2.

The patterns 2, as shown in FIG. 2, each having at the projecting side surface thereof patterns each having the concave surface *2a* expanding outwardly from the central portion of each pattern. Each concave surface *2a* is filled with synthetic resin different in coloring from each pattern so as to form a different color layer gradually varying in thickness. The synthetic resin sheet 4, after the different color layer 3 is completed, is stuck onto and along the outer surface of the respective pattens 2, in other words, at the side of concave surface *2a*.

Figure 3:
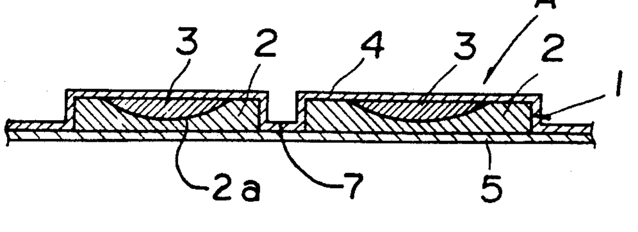
FIG. 3 is an enlarged sectional view of a modified embodiment of the invention, to which a backing sheet is stuck.
Figure 5:
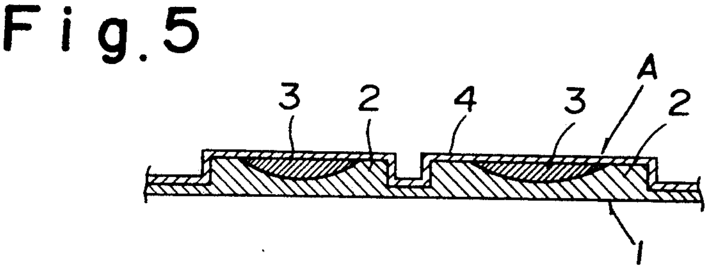
FIG. 5 is an enlarged sectional view of an embodiment of a sheet body.

Alternatively, the patterns 1 may previously continue at the roots of the projections as shown in FIG. 5. Or, a separate backing sheet 5, such as woven cloth, unwoven fabric or a thermoplastic synthetic resin sheet, may be used to form the sheet body 1 as shown in FIG. 3.

The concave formed by the concave surface *2a* as shown in FIG. 2 may perforate each pattern 2 at the central portion of the concave.

Figure 6:
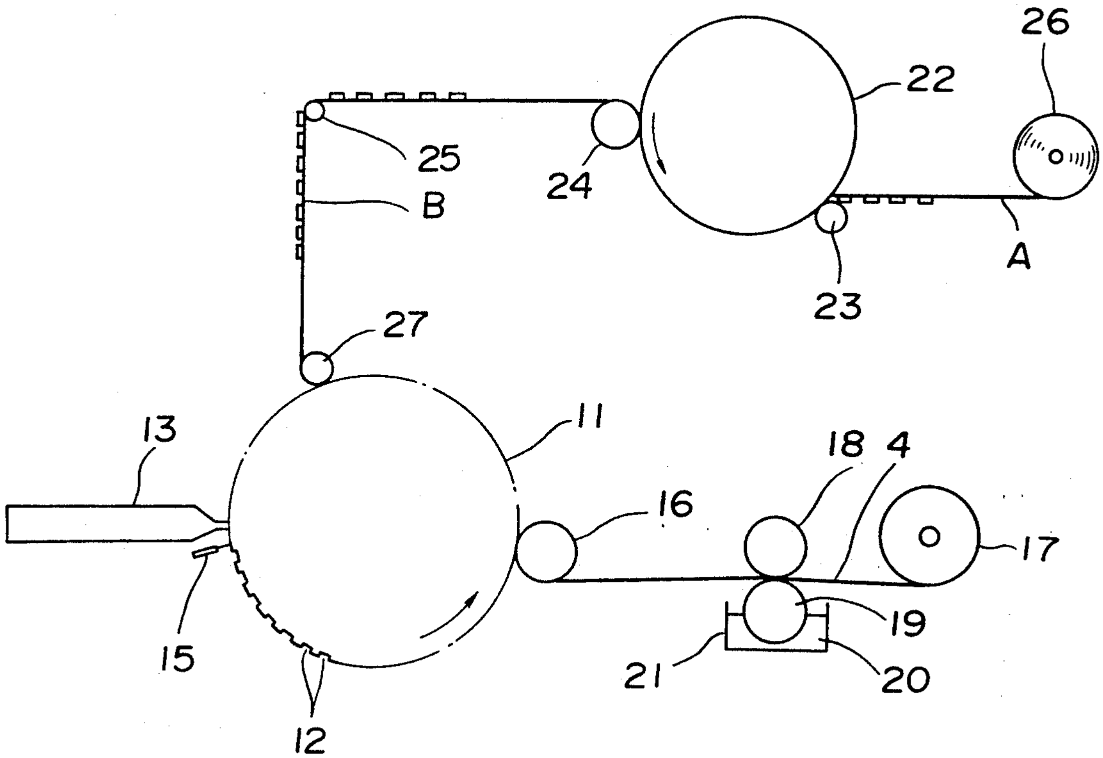
FIG. 6 is a schematic view of a manufacturing apparatus for manufacturing the pattern sheets in FIGS. 1 and 2.

The synthetic resin pattern sheet A constructed as the above-mentioned is manufactured by, for example, a manufacturing apparatus as shown in FIG. 6.

In FIG. 6, reference numeral 11 designates a cylindrical metallic mold, at the outer periphery of which is formed a large number of recessed patterns 12 of optional configuration, an extruder 13 is disposed laterally of the metallic mold 11 in such a manner that its extrusion head is in close proximity to the outer surface of mold 11, synthetic resin extruded from the extruder 13 is filled in each recessed pattern 12, and a doctor blade 15 of soft material is disposed at the front of the mold 11 in the rotation direction thereof and in relation of being brought into press-contact with the outer periphery of mold 11 so as to scrape off part of the outer surface of synthetic resin filled in each recessed pattern 12, thereby forming the concave surface *2a* at the outer surface of each pattern 2.

In addition, the metallic mold 11 at need is provided with a heater and a cooler.

Figure 4:
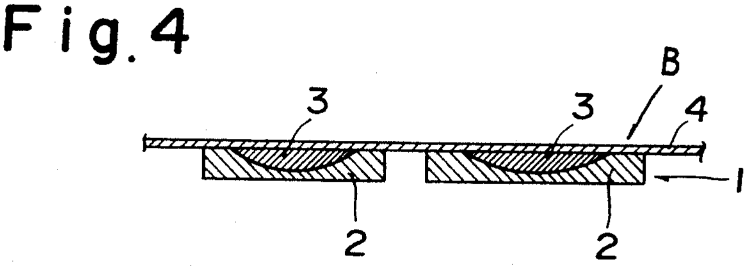
FIG. 4 is a sectional view of an intermediate product of the FIGS. 2 and 3 embodiments.

On the outer surface of metallic mold 11 and at the reverse side to the extruder 13 is rotatably provided an adhesive roll 16 of soft material, such as rubber, in the state of bringing the roll 16 into press-contact with the mold 11, a supply roll 17, on which the transparent or opaque synthetic resin sheet 4 is wound, is rotatably disposed laterally outside the adhesive roll 16, a receiving roll 18 and an applying roll 19 are supported opposite to each other at an intermediate portion between the supply roll 17 and the adhesive roll 16 and at both vertical sides of the sheet 4 delivered from the supply roll 17, the applying roll 19 enters at the lower side of the outer periphery into a reservoir 21 filled with liquid synthetic resin different in coloring from the synthetic resin extruded from the extruder 13 to form the patterns 2, the liquid synthetic resin 20 in the reservoir 21 is transferred to the synthetic resin sheet 4 through the applying roll 19 and brought into press-contact with the mold 11 by the adhesive roll 16, thereby being stuck onto the outer surface of each pattern 2, at which time the liquid synthetic resin 20 applied on the sheet 4 is filled on the concave surface *2a*, heated by a heater provided in the mold 11, hardened integrally with the patterns 2 while moving along the outer periphery of the metallic mold 11, and peeled off therefrom through a peeling-off roll 27, thereby forming an intermediate product B as shown in FIG. 4.

In addition, the liquid synthetic resin 20 applied on the synthetic resin sheet 4 in press-contact with the surface of mold 11 and positioned between the recessed patterns 12 is almost eliminated by being pressed to the adhesive roll 16 and little remaining synthetic resin 20 becomes a thin film, thereby not coloring the sheet A.

At the downstream side of the intermediate product B in the transporting direction thereof is rotatably supported a cylinder 22 having a heater and a cooler, at the outer peripheral portion of the cylinder 22 and in front and in the rear in the rotation direction thereof are provided a guide roll 23 and an urging roll 24 of soft material, such as rubber, and the intermediate product B guided to the cylinder 22 is urged by the urging roll 24 while being heated to thereby a mold synthetic resin sheet 4 along the patterns 2, thereby forming the synthetic resin pattern sheet A as shown in FIG. 2. The pattern sheet A thus molded is peeled off from the guide roll 23 and then wound up to a take-up roll 26 disposed laterally outside the cylinder 22.

Next, explanation will be given on an embodiment of the synthetic resin pattern sheet of the invention manufactured by the above-mentioned manufacturing apparatus.

At first, synthetic resin extruded from the extruder 13 so as to form the patterns 2, uses vinyl chloride resin blending, for example, Nipporit SL (suspension resin by Chisso Co., Ltd.) of 100 parts by weight, DOP (plasticizer by Sekisui Chemical C., Ltd.) of 60 parts by weight, MA-11 (Akisima Chemical Industry Co., Ltd) of 2 parts by weight, Softon 1000 (calcium carbonate by Bihoku Funka Co., Ltd.) of 60 parts by weight, and Pigment (green) of 3 parts by weight.

The resin is extruded from the extruder 13 and filled in the recessed patterns 12 and the metallic mold 11, the doctor blade 15 excessively removes the resin therefrom and forms the concave surfaces *2a*, and thereafter the sheet A is heated up to 130° C. and hardened, thereby molding the patterns 2.

The synthetic resin sheet 4 supplied to the patterns 2 after hardened uses, for example, a transparent sheet of vinyl chloride of 0.08 mm in thickness and the liquid synthetic resin to be applied to the sheet 4 uses vinyl chloride resin blending, for example, Geon 61 (paste resin by Japanese Geon Co., Ltd.) of 55 parts by weight, DOP (plasticizer by Sekisui Chemical Co., Ltd.) of 55 parts by weight, MA-11 (stabilizer by Akisima Chemical Industry Co., Ltd.) of 2 parts by weight, and pigment (white) of 0.5 parts by weight.

The resin, after applied to the synthetic resin sheet 4, is supplied to the metallic mold 11 so as to be stuck thereby by the roller 16, heated up to 180° C. by a heater provided at the mold 11 and hardened, cooled down to about 75° C., and thereafter peeled off from the mold 11, thereby forming an intermediate product B.

Thereafter, the intermediate product is supplied to the cylinder 22 and heated up to about 130° C. by a heater thereof. In such state, the urging roll 24 urges the synthetic resin sheet 4, which is coupled with the outer surfaces of the patterns 2 as shown in FIG. 2. By urging the synthetic resin sheet to couple with the outer surfaces of the patterns 2 as shown in FIG. 6 troughs 7, surrounding the non-continuous projecting patterns, are created as shown in FIGS. 2 and 3.

The synthetic resin pattern sheet A constructed as the above-mentioned is colored in green, and white synthetic resin 20 is filled in the concave surface *2a* at the outer surface of each pattern 2, so that the different color layer 3 formed at the bottom of the concave is white. The concave is gradually smaller in thickness toward the outer periphery, so that the different color layer 3 gradually smaller in thickness changes in color gradually from white to green, and green gradually continuously becomes dark toward the outer periphery of different color layer 3, so that variation in depth of the concave surface *2a*, in other words, variation in thickness of the different color layer 3 externally appears through the synthetic resin sheet 4 in a manner of continuously gradating, thereby presenting an appearance of light snow laying and being rich in the natural feeling and stereo effect. In other words, the different color layer 3 formed on the concave surface *2a* is thick at the central portion and gradually thin from the center to the periphery, whereby at the peripheral portion of the concave surface *2a* is displayed the coloring of green synthetic resin. The coloring of the liquid synthetic resin 20 forming the different color layer 3 gradually changes from green to white, thereby showing the natural feeling and stereo effect. Also, the concave surface *2a* varies in configuration, size and depth, so as to desirably adjust the variation, whereby combination of the configuration, size and depth, can present optional natural feeling and stereo effect by use of the desired patterns. In addition, other than the opaque or translucent synthetic resin as above-mentioned, transparent synthetic resin may alternatively be used to form the patterns 2.

The patterns 2 at the sheet body 1 is formed by transparent through opaque synthetic resin, and the different color layer 3 is formed by opaque synthetic resin different in color from the patterns 2 as above-mentioned, so that color of patterns 2 and that of different color layer together appear therethrough to the exterior to produce the patterns 2 rich in the natural feeling and stereo effect. Alternatively, the different color layer 3 may use opaque synthetic resin or a backing sheet 5 as shown in FIG. 3. In the latter case, a vinyl chloride sheet colored in red and 0.2 mm thick is used to mold the pattern sheet A, and thereafter the backing sheet 5 is stuck by the press-contact roll to the pattern sheet A while being heated. Then, the backing sheet 5 is heated up to, for example, about 140° C., thereby being integrally stuck to the patterns 2 at the pattern sheet A and the rear surface of the synthetic resin sheet 4 positioned between the patterns 2.

Figure 7:
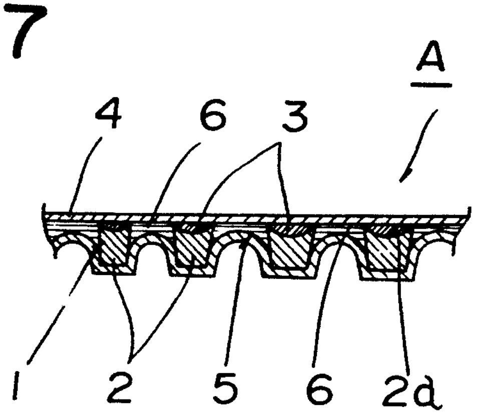
FIG. 7 is a sectional view of another modified embodiment of the pattern sheet of the invention.

Alternatively, the backing sheet 5 may, as shown in FIG. 7, be stuck along the patterns 2. In this case, it is preferable than between the backing sheet 5 and the synthetic resin sheet 4 is provided a colored layer 6 different in coloring from the synthetic resin forming the patterns 2 and from the forming the different color layer 3.

Figure 8:
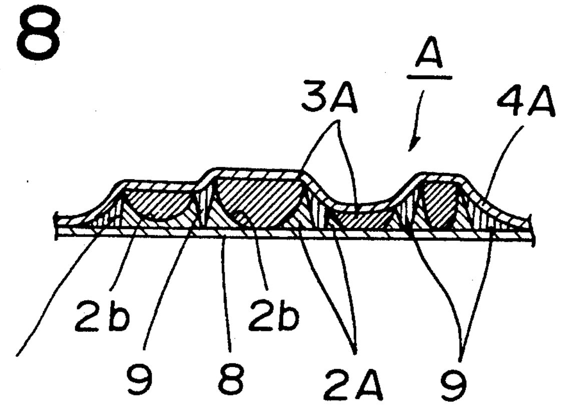
FIG. 8 is a sectional view of still another modified embodiment of the pattern sheet of the invention.

Alternatively, the concave surface may, as shown in FIG. 8 have, perforations in each pattern 2 of a concave surface *2b*.

Figure 9:
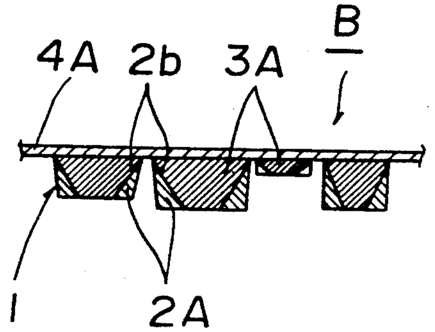
FIG. 9 is a sectional view of the intermediate product of the FIG. 8 embodiment.

In this case, as the same as FIG. 4. after patterns 2A are molded, synthetic resin different in coloring therefrom and forming a different color layer 3A is filled in the concave surface *2b*, a synthetic resin sheet 4A is stuck to the surface side of concave surface *2b* to form an intermediate product B as shown in FIG. 9, thereafter the synthetic resin sheet is stuck along the outer periphery of pattern 2A as shown in FIG. 8, and the backing sheet 8 is stuck to the rear surface of each pattern 2A.

In this case, as the same as the embodiment in FIG. 7, it is preferable to interpose therein a colored layer 9 different in coloring from synthetic resin forming the patterns 2 or that forming the different color layer 3A.

In the embodiments in FIGS. 8 and 9, in the case where, for example, the patterns 2A are formed by use of green synthetic resin, the different color layer 3A by blue synthetic resin, and the colored layer 9 by light blue synthetic resin, part of the different color layer 3A larger in thickness and formed at part of concave surface *2b* larger in depth displays dark blue, that 3A smaller in thickness and formed at the outer periphery of the same continuously displays light blue gradually including green, so that variation in depth of concave surface *2b* is shown to the exterior in a manner of continuous gradation through the synthetic resin sheet 4. Furthermore, between the synthetic resin sheet 4 and the backing sheet 8 and between the respective patterns are interposed light blue colored layers 9 which are shown to the exterior through the synthetic resin sheet 4, thereby obtaining a pattern sheet as if forming at both side surfaces glassy inlaid patterns.

As seen from the above, the present invention continuously varies the color tone and lightness of each pattern 2 provided at the sheet body 1 so as to display to the exterior variation in depth of patterns 2, thereby simply obtaining the synthetic resin pattern sheet rich in the natural feeling and stereo effect.

Although several embodiments have been described, they are merely exemplary of the invention and not to be constructed as limiting, the invention being defined solely by the appended claims.

What is claimed is:

1. A synthetic resin pattern sheet having a continuously variable color tone, comprising:

a) a transparent or translucent synthetic resin sheet having the size of said synthetic resin pattern sheet;

b) a plurality of separate synthetic resin blocks, each having a thickness and having a top surface in the thicknesswise direction, each top surface having a concave area, said concave area being of varying depth thereover, said blocks being arranged on said synthetic resin sheet with spaces between them and being joined with said synthetic resin sheet at the top surface, a group of said blocks forming a pattern; and c) a synthetic resin layer with which said concave area is filled, said synthetic resin layer being of varying thickness, and being of a color different than the color of said block in which said synthetic resin layer is located.

2. The synthetic resin pattern sheet according to claim 1 wherein each of said blocks includes a backing sheet adhering to said blocks at the opposite side of said top surface.

3. The synthetic resin pattern sheet according to claim 1 further comprising:

i) a backing sheet attached to said blocks at the opposite side of said top surface; and ii) a colored layer positioned between said backing sheet and said synthetic resin sheet, said color layer being of a different color than the color of said blocks and the color of the synthetic resin layer.

* * * * *